United States Patent [19]

Mundy

[11] 4,087,193
[45] May 2, 1978

[54] CUTTING TOOL WITH CHIP BREAKER

[75] Inventor: William L. Mundy, St. Louis, Mo.

[73] Assignee: Allen J. Portnoy, St. Louis, Mo. ; a part interest

[21] Appl. No.: 719,285

[22] Filed: Aug. 31, 1976

[51] Int. Cl.² .............................................. B26D 1/12
[52] U.S. Cl. ..................................................... 407/114
[58] Field of Search .................... 29/95 R, 95 A, 95 B, 29/95 C, 96

[56] References Cited

U.S. PATENT DOCUMENTS

| 1,756,516 | 4/1930 | Klopstock | 29/95 R |
| 3,733,664 | 5/1973 | McKelvey | 29/95 R |
| 3,751,782 | 8/1973 | Fruish | 29/95 R |
| 3,973,307 | 8/1976 | McCreery et al. | 29/95 R |
| 3,973,308 | 8/1976 | Lundgren | 29/95 R |

Primary Examiner—Harrison L. Hinson
Attorney, Agent, or Firm—Rogers, Eilers & Howell

[57] ABSTRACT

A cutting tool made of a material that retains its cutting effectiveness at temperatures over 1200° F., and including a chip breaker geometry, for the continuous machining of metal, having a first top generally planar surface and an end surface which join to define the cutting edge of the tool and which join at an included angle such that the tool has a relatively high positive rake angle. A second top generally planar surface extends from the first top surface away from the cutting edge and forms an included angle with the first top surface of between about 125° and 145°. The upper surface of the tool at the other end of the second top surface drops below the second top surface. This allows a chip formed during machining to move from the cutting edge, over the first and second top surfaces, and relatively unobstructed past the edge of the other end of the second top surface. The lengths of the first and second top surfaces are approximately equal and the edge at the other end of the second top surface lies below the cutting edge of the tool. The tool may be formed as a polygonal shaped insert.

12 Claims, 18 Drawing Figures

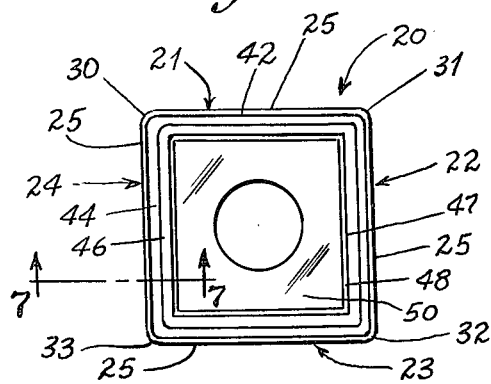
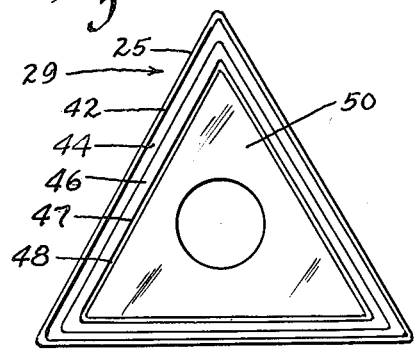
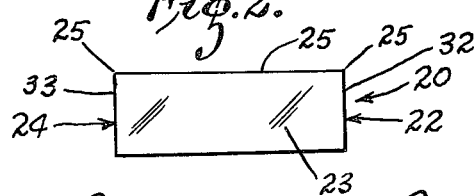
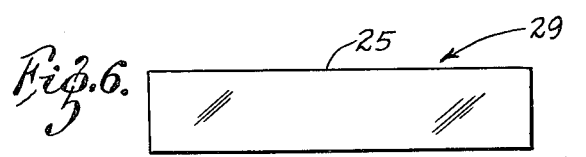
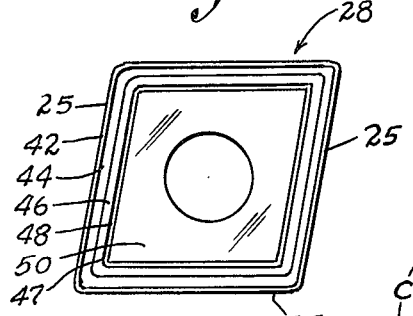
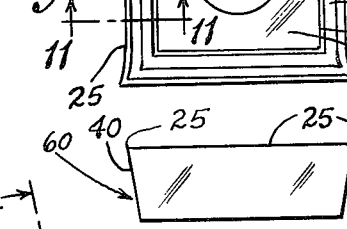
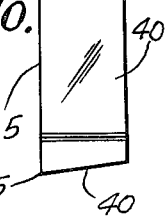
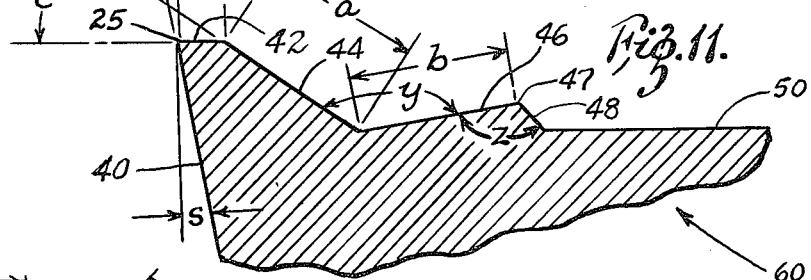
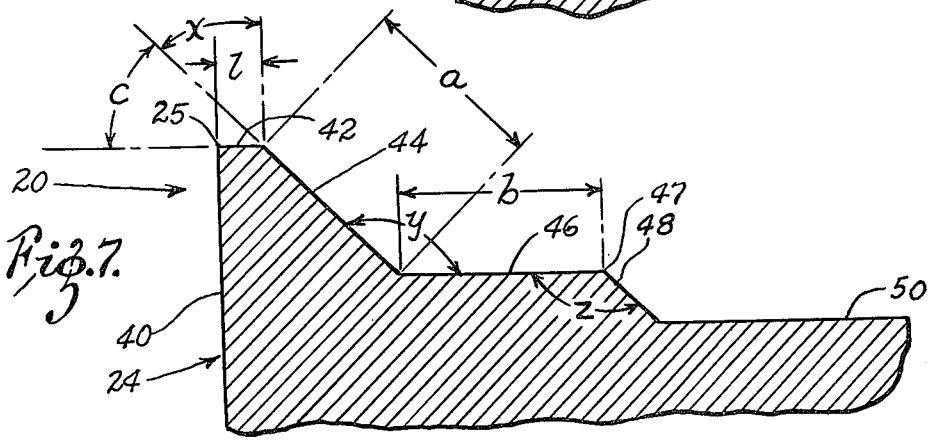

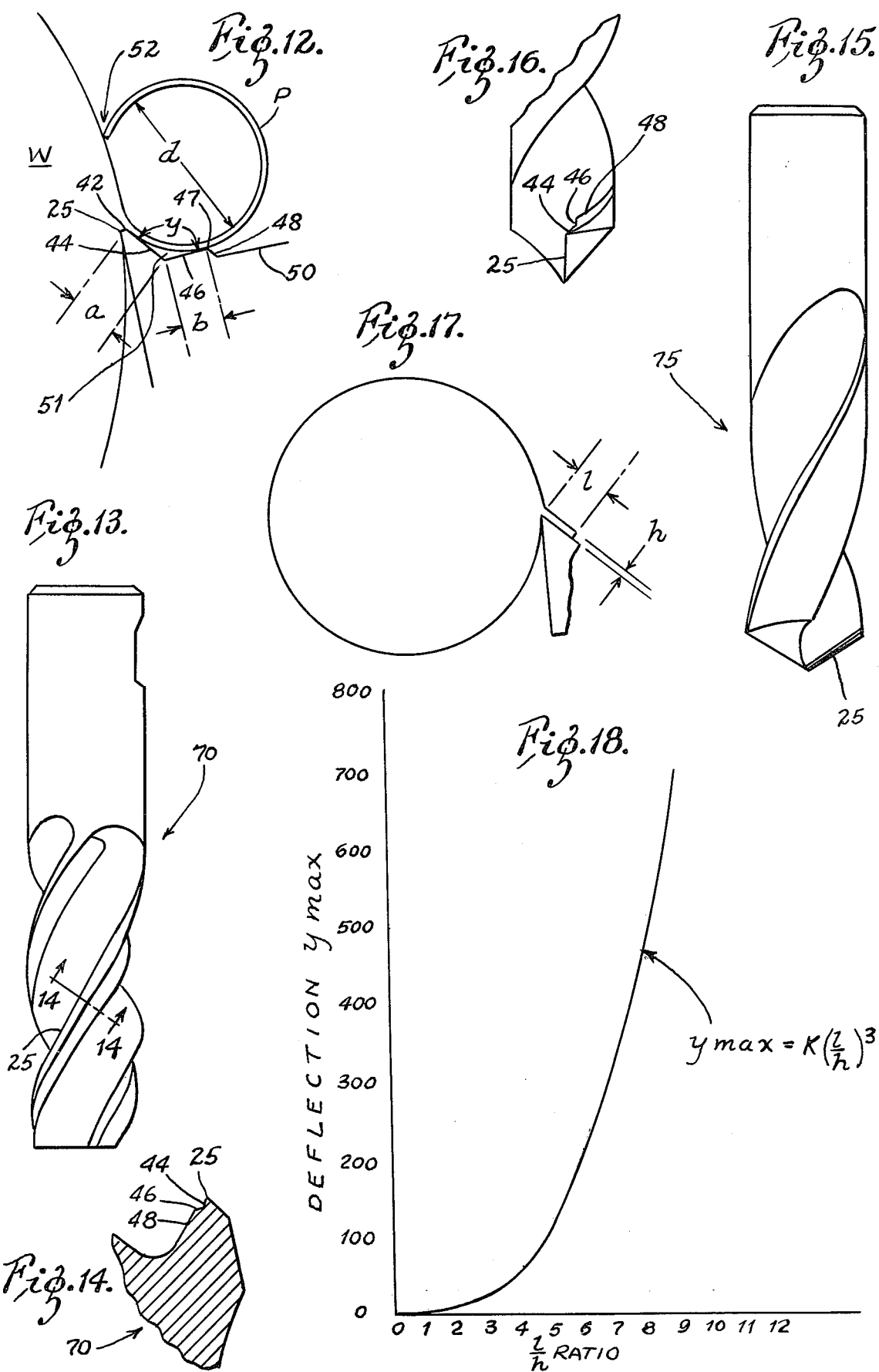

CUTTING TOOL WITH CHIP BREAKER

SUMMARY AND BACKGROUND OF THE INVENTION

This invention relates to cutting tools with a novel chip breaker design, and specifically tools with the chip breaker formed integrally therewith and made of a material which retains its cutting effectiveness at temperatures above 1200° F. Still more specifically, the chip breaker design of this invention is for use with tools of such material having an effective rake angle defined in accordance with the teachings of U.S. Pat. No. 3,837,240 issued Sept. 24, 1974, entitled "Cutting Tool For The Continuous Machining Of Metals And The Method Of Making Same", of the same inventor, which patent is incorporated herein by reference.

Conventional tools of such materials such as carbide have typically had only slight positive, zero, or even negative rake angles, the concept being to use the high compressive strength and high temperature tolerance of the carbide to effectively plow off the metal during the machining process. The result has been to produce a high temperature, ductile, and continuous chip which has been relatively difficult to break. A further result has been a tendency for the chip of such a conventional tool to create cratering by erosion of the top surface of the tool adjacent the cutting edge. As this cratering continues, or becomes deeper, the tool is weakened near the cutting edge and the continuous plowing of the chip into the crater eventually breaks off the cutting edge causing tool failure. These disadvantages are also inherent in some prior art chip breaker designs, for one prior art solution has been to effectively preform such a crater in the tool adjacent the cutting edge so that as the chip is formed it moves through the generally rounded crater and is caused to curl and finally break by either impinging on itself of the workpiece. However, these preformed craters impose too much restraint on the chip at the back side of the crater creating excessive reactive forces acting back through the curved portion of the chip toward the front part of the crater tending to break off the cutting edge of the tool and severely shorten the tool life.

In contrast, the tool and chip breaker design of the present invention overcomes these problems by the unique combination of its chip breaker design on high temperature tools such as carbides having relatively high positive rake angles as taught by the referenced patent.

In accordance with the teachings of the referenced patent, the effective rake angle is defined as a function of the characteristics of the workpiece to be machined. The effective rake angle is defined substantially in accordance with the formula $\cos C = l_i/l_f \cos D$ where $C$ is the effective rake angle of the cutting tool, $l_i/l_f$ is the ratio of the initial length to final length of a specimen of a metal to be machined when tensile loaded to failure measured parallel to the applied load, and $D$ is the neck down angle of the specimen in the failure area after being tensile loaded to failure. With the application of these teachings, the effective rake angle is always positive, and it has been found that for most ductile metals this angle is in excess of about 25° and usually about 35°, and as much as 55°.

As further taught by the referenced patent, a cutting tool having an effective rake angle so defined will create a minimum amount of distortion or deformation of the parent metal and will work harden the chip during the machining process. Additionally, the chip will be of a relatively low temperature as compared to that produced by the conventional tools heretofore described.

The chip breaker design of the present invention makes use of these chip characteristics produced by the teachings of the referenced patent to overcome the problems of the prior art by providing a chip breaker for use with a high temperature tool, such as carbide, having a relatively high positive effective rake angle and which allows the work hardened chip to slide over a first top surface at the high effective rake angle and then over a second top surface extending inwardly from the first. The second top surface is formed at an angle with respect to the first that causes the chip to curl but allows it to move freely past the inner edge of the second surface, the portion of the insert behind the inner edge of the second surface dropping below said second surface. The chip, upon curling and impinging on the workpiece, is preferably caused to break against the inner edge of the second surface, which edge is below the cutting edge of the tool. The unique design substantially reduces cratering and has a "self-maintaining" effect due to the simultaneous wearing of the first and second surfaces as the chip is continuously formed to maintain the chip breaker geometry. It also reduces the reactive forces tending to break off the cutting edge.

In one preferred embodiment the tool is a polygonal insert with each side so formed with a cutting edge and chip breaker.

Thus, it is a primary object of this invention to provide a chip breaker design for a high temperature tool, such as carbide, for use with relatively high positive effective rake angles, where the work hardened chip is caused to curl and break without creating severe reaction forces through the chip tending to break off the cutting edge and reduce the tool life, and it is a further object of the invention to provide such a design which has a self-maintaining effect to thus prolong the life of the chip breaker geometry. These and other objects of the invention are apparent from the drawing and detailed description to follow.

DESCRIPTION OF THE DRAWINGS

FIGS. 1, 3, 5, and 8 are plan views of cutting tool inserts embodying this invention;

FIG. 2 is a side elevation of FIG. 1;

FIG. 4 is a side elevation of FIG. 3;

FIG. 6 is a side elevation of FIG. 5;

FIG. 7 is an enlarged view in section taken generally along the line 7—7 of FIG. 1;

FIGS. 9 and 10 are side elevation views of FIG. 8;

FIG. 11 is an enlarged view in section taken generally along the line 11—11 of FIG. 8;

FIG. 12 is a schematic illustrating a cutting tool of this invention and producing a chip during a machining operation on a workpiece;

FIG. 13 is a side elevation view of an end mill including this invention;

FIG. 14 is a view in section taken generally along the line 14—14 of FIG. 13;

FIG. 15 is a side elevation view of a drill including this invention;

FIG. 16 is another side elevation view of the drill of FIG. 15 taken at 90° from the view of FIG. 15;

FIG. 17 is a schematic illustrating a cantilever principle relating to the formation of a chip during the machining process; and FIG. 18 is a graph of the equation $Y = k(l/h)^3$.

DETAILED DESCRIPTION OF A PREFERRED EMBODIMENT

This invention is primarily directed to a cutting tool with a chip breaker for the continuous machining of metal. In its preferred embodiment, the invention is directed to such tools made of a material having a high red hardness. By this is meant that the temperature at which these tools maintain their cutting effectiveness is in excess of approximately 1200° F. Such materials embrace the carbides including those of tungsten, tantalum, titanium, etc., ceramics such as those based on alumina, silica, and the like; natural and synthetic diamond; etc. of these materials, all generally known in the art, the carbides represent a particularly preferred class. Such materials are treated in numerous references, among which may be cited "Machining Data Handbook," Second Edition, MetCut Research Associates, Inc., Cincinnati, Ohio, 1972.

The principle of the invention as the same is described hereinafter, may apply generally to tools adapted for the continuous machining of metal, such as for example, lathe tools, branches, drills, end mills, and the like. By "continuous machining" here is meant the more or less constant machining of metal as occurs in machine tools where a substantially constant relationship is maintained between the workpiece being cut and the cutting tool throughout a cutting operation. Lathe tools, broaches, drills, and end mills are among those typically used in such machining operations. This invention is further primarily directed to such a tool made of one of the aforementioned materials that retains its cutting effectiveness at over 1200° F.

In the drawing (FIGS. 1 and 2) there is shown an insert 20 of a material that retains its cutting effectiveness at temperatures over 1200° F. and preferably carbide. In the embodiment shown, the insert 20 has four sides 21 through 24, with each side having an upper cutting edge 25. The geometry of the cutting edge and chip breaker of this invention preferably is duplicated at each edge 25 so that the insert effectively has four cutting edges, all identical. As will become further apparent, the same geometry is maintained at the corners 30 through 33 so that they also can be used in machining. While a square polygonal shape has been illustrated in this embodiment, it will be obvious to those skilled in the art that other polygonal shapes could also be used such as those shown by references 28 and 29 of FIGS. 3 through 6, and that this invention can be readily used with solid tools (those without inserts where the entire tool is made of carbide or the like).

Referring to FIG. 7, the cutting edge and chip breaker geometry of this invention, preferably for each cutting edge of the insert, is shown to have a side or end wall 40 which defines the side of the insert and which terminates at the cutting edge 25 in a small land 42. This land should be formed as small as possible and will usually be between about 0.002–0.010 inches wide. A land of at least some small width is required because it prevents chipping of the cutting edge during machining and because of the practical limitations to the sharpness of the edge that can be formed by molding.

Extending downwardly and inwardly from the land 42 is a surface 44 which is formed at an angle $x$ with the side 40 to provide an effective rake angle $c$ at the cutting edge in accordance with the teachings of the referenced patent. It has been found that for the most ductile materials to be machined the effective rake angle $c$ is calculated to be in excess of about 25° and more particularly between approximately 30° and 40°, and as high as 55°. Since the insert 20 is intended to be tilted during machining to provide some relief between the wall 40 and the workpiece being machined, which relief is approximately 10°–20°, it has been found that for machining the ductile metals, the included angle $x$ formed by the surface 44 with the wall 40 is usually less than 55°.

Extending inwardly from the surface 44 is another surface 46 which terminates inwardly at an edge 47 at which the surface of the insert drops off inwardly along a sloping surface 48 to a recessed central portion 50 which constitutes the majority of the surface area at the top side of the insert. Thus, the surfaces 42, 44, 46, and 48 together extend only a short distance from the cutting edge inwardly toward the center, and yet they perform the important functions of defining the cutting edge and effective rake angle for machining the workpiece as well as defining an effective means for breaking the chip thus formed while minimizing the reactive forces which would otherwise shear off the cutting edge.

FIG. 12 shows the operation of the tool and chip breaker of this invention when used to machine a work piece W from which is formed a chip P. It will be noted that the chip P is caused to curl as it slides down the surface 44 and contacts the surface 46, the contact with the surface 46 causing the chip to deflect and form into a curl. Thus, the angle $y$ formed by the surfaces 44 and 46 is critical, within limits, since if the angle is too small, the chip will jam and bind into the surface 46 rather than deflect off and move past the end of that surface. If the angle $y$ is too great, there is insufficient deflection to produce a chip of small enough radius to be effectively broken. The angle $y$ should be between about 125° and 145° and preferably about 135°.

The lengths $a$ and $b$ of the surfaces 44 and 46 should be approximately equal and should be selected along with the angle $y$ such that the diameter of the chip P thus formed will cause the end of the chip to impinge back on the workpiece as shown at 52 above the cutting edge of the insert, causing the chip to bend and snap or break across the edge 47. As a result, small partially curled chips are formed which are relatively harmless and quite easy to handle. With $d$ representing the diameter of the chip formed, and the angle $y$ at 135°, the length $a$ of the surface 44, and hence the length $b$ of the surface 46, are calculated by the formula $a = 0.2071d$. The diameter of the chip desired will depend on such factors as the cutting speed, the coolant, the feed rate (chip thickness), and the material being machined. For example, a chip diameter of 0.080 inches ($a = 0.017$ inches) would be used for a relatively thin chip, while a chip diameter of 0.250 ($a = 0.052$ inches) would be desirable for a relatively thick chip. Values of $a$ as low as 0.003 of an inch have been used with this invention.

It will be evident that the smaller the angle $y$, the smaller the diameter of the chip, and conversely, the greater the angle $y$, the greater the diameter of the chip.

It has been found that there are practical limits in selecting a proper chip diameter to break the chip effectively. If the diameter is too great, the chip will tend to spiral instead of break, and if the diameter is too small, excessive forces are required to curl the chip which can break the tool. In this respect an analogy can be drawn between the chip being formed and a cantilever beam. For purposes of this analogy, the formula for deflection of the cantilever beam reduces to $y = k(l/h)^3$, where $y$ is the deflection of the beam, $k$ is a constant for a given situation, $l$ is the length of the beam, and $h$ is the beam thickness. These parameters are illustrated in FIG. 17 and the relationship of $y$ as a function of $l/h$ is shown by the graph of FIG. 18. Thus, it can be seen that for low values of the ratio $l/h$, such as less than 3, the beam deflection is very small, but as the value of the ratio increases, the beam or chip deflection increases rapidly or exponentially. It will be seen from the graph of FIG. 18 that the curve begins to increase most rapidly at approximately the value 3 for the ratio $l/h$. The selection of this value has been found quite effective. Since the length $a$ of the surface 44 determines the length of the chip (or cantilever beam) at which deflection occurs, it has been found effective to select the length $a$, and hence the length $b$, to be approximately three times the chip thickness. This will produce sufficient deflection of the chip for proper breaking without requiring excessive forces which might break off the cutting edge of the tool as might occur if the ratio of $l/h$, and hence the ratio of $a$/chip thickness were selected at a lower value such as 1.

The edge 47 is preferably relatively sharp, the angle $z$ (FIG. 7) formed between the surfaces 46 and 48 being preferably no greater than 135°, to provide a fulcrum over which the breaking of the chip is initiated under dynamic conditions as it impinges against the workpiece. Yet the chip is unobstructed as it moves inwardly past the edge 47 so that the reactive forces and particularly those created by the chip acting against the surface 44, are minimized to thereby minimize any tendency for the cutting edge to break off. These reactive forces are also minimized by the fact that the edge 47 is lower than the cutting edge because of the relatively high rake angle and the relatively high values for the angle $y$. This means that there is no obstacle acting against the work hardened chip at a location inwardly from, but at about the same level or a higher level than, the cutting edge that would produce a greater reactive force against the surface 44 with a greater tendency to shear off the cutting edge.

The chip breaker design of this invention provides another significant advantage in that the corner formed by the surfaces 44 and 46 defines a path 51 between these surfaces and the chip P through which coolant flows during machining to quickly lubricate and cool the chip. This makes the chip more brittle and easier to break.

It will also be noted that any wearing of the tool caused by frictional engagement of the chip will tend to occur at the surface 46. The tendency is for this wearing to occur relatively evenly so that as the cutting edge 25 is worn, so also are the top surfaces 44 and 46 where the chip impinges thereon. The result is that the chip breaker geometry of this invention is maintained over a considerable time to prolong the tool life.

In FIGS. 8 through 11 there is shown another embodiment of the invention, where the relief angle $s$ is built into the design of the insert. Thus, there is shown an insert 60 where only the upper sides of the insert are formed with the geometry of this invention. The side 40 is tapered to provide the relief angle $s$. The included angle $x$ formed by the surface 44 with the wall 40 is the same as the angle $x$ in the first-described embodiment. Also, the angle $y$ of this embodiment is the same as in the first-described embodiment. Since the relief angle $s$ is built into the design of this embodiment, the surface 50 is formed at an angle 90° $-s$ relative to the surface 40, rather than being normal to the surface 40 as in the first-described embodiment. Other than the differences noted, the geometry of this described embodiment is the same as with the first described embodiment.

In FIGS. 13 and 14 there is shown an end mill 70 having the geometry of this invention. Thus, the end mill 70 has a cutting edge 25 and surfaces 44, 46, and 48 formed with generally the same geometry as the insert of FIGS. 8 through 11.

In FIGS. 15 and 16 there is shown a drill 75 having the geometry of this invention. Thus, the drill 75 has a cutting edge 25 and surfaces 44, 46, and 48 formed generally with the same geometry as the insert of FIGS. 8 through 11.

Thus, there has been described a cutting tool with a chip breaker geometry integral therewith, and made of a material that retains its cutting effectiveness at temperatures over 1200° F., which effectively breaks relatively hard chips produced with relatively high positive effective rake angles and which minimizes the reactive forces tending to break or shear off the cutting edge.

Various changes and modifications may be made in this invention, as will be readily apparent to those skilled in the art. Such changes and modifications are within the scope and teaching of this invention as defined by the claims appended hereto.

What is claimed is:

1. A cutting tool with chip breaker for the continuous machining of metal comprising a first top generally planar surface, an end surface, and a land surface, said first top and end surfaces being joined to and separated by said land surface, the cutting edge of said tool defined by the joinder of said land and end surfaces, the included angle between said first top and end surfaces being less than 55°, a second top generally planar surface extending at one end from said first top surface away from said cutting edge and forming an included angle with said first top surface of between about 125° and 145° measured outwardly of the tool body, said second top surface terminating at its other end in a second edge, the top of said tool, at the side of said second edge away from the cutting edge dropping below said second edge to allow a chip formed during machining to move from said cutting edge, over said first and second top surfaces, and relatively unobstructed past said second edge, the lengths of the first and second top surfaces being approximately equal and said second edge being below the cutting edge of the tool, the tool being made of a material that retains its cutting effectiveness at temperatures over 1200° F.

2. The cutting tool of claim 1 wherein said end surface is formed to define an end relief for said tool.

3. The cutting tool of claim 1 wherein said included angle formed by said first and second top surfaces is approximately 135°.

4. The cutting tool of claim 1 wherein said tool is formed as an insert of polygonal shape with said cutting edge and chip breaker formed at each of its sides.

5. The cutting tool of claim 1 wherein the length of each of the first and second top surfaces is at least 0.003 of an inch.

6. A cutting tool with a chip breaker for the continuous machining of metal comprising a first top surface, an end surface, and a land surface, said first top and end surfaces being joined to and separated by said land surface, the cutting edge of said tool defined by the joinder of said land and end surfaces, the included angle between said first top and end surfaces being less than about 55°, a second top surface of approximately the same length as the first top surface and extending at one end from said first top surface away from said cutting edge and terminating at its other end in a second edge, the top of the tool at the side of said second edge away from the cutting edge dropping below said second edge, and said second edge being below the cutting edge of the tool, a chip formed during machining moving from said cutting edge, over said first and second top surfaces and past said second edge of said second top surface, the included angle formed by said first and second top surfaces causing a chip formed during machining to curl but allowing it to move freely past said second edge, the tool being made of a material that retains it cutting effectiveness at temperatures over 1200° F.

7. The cutting tool of claim 6 wherein the included angle between said first and second top surfaces is approximately 135°.

8. The cutting tool of claim 6 wherein said second edge is relatively sharp providing a fulcrum over which the breaking of the chip is initiated under dynamic conditions during machining.

9. The cutting tool of claim 6 wherein said first and second top surfaces join at a corner defining a path between said first and second top surfaces and a chip formed during machining for the flow of coolant therethrough.

10. A cutting tool with chip breaker for the continuous machining of metal comprising a first top generally planar surface, an end surface, and a land surface, said first top and end surfaces being joined to and separated by said land surface, the cutting edge of said tool defined by the joinder of said land and end surfaces, the included angle between said first top and end surfaces being less than about 55°, a second top generally planar surface extending at one end from said first top surface away from said cutting edge and forming an included angle with said first top surface of between about 125° and 145° measured outwardly of the tool body, said second top surface terminating at its other end in a second edge, the top of said tool, at the side of said second edge away from the cutting edge dropping below said second edge to allow a chip formed during machining to move from said cutting edge, over said first and second top surfaces, and relatively unobstructed past said second edge, the lengths of the first and second top surfaces being approximately equal and said second edge being below the cutting edge of the tool.

11. A cutting tool with chip breaker for the continuous machining of metal comprising a first top surface, an end surface, and a land surface, said first top and end surfaces being joined to and separated by said land surface, the cutting edge of said tool defined by the joinder of said land and end surfaces, the included angle between said first top and end surfaces being less than about 55°, a second top surface of approximately the same length as said first top surface and extending at one end from said first top surface away from said cutting edge and terminating at its other end in a second edge, the top of the tool at the side of said second edge away from the cutting edge dropping below said second edge, and said second edge being below the cutting edge of the tool, a chip formed during machining moving from said cutting edge, over said first and second top surfaces and past said second edge of said second top surface, the included angle formed by said first and second top surfaces measured outwardly of the tool body causing a chip formed during machining to curl but allowing it to move freely past said second edge.

12. The cutting tool of claim 10 wherein said second edge is relatively sharp, the top of the tool at the side of said second edge away from the cutting edge dropping sharply below said second edge, providing a fulcrum over which the breaking of the chip is initiated under dynamic conditions during machining.

* * * * *

UNITED STATES PATENT OFFICE
CERTIFICATE OF CORRECTION

Patent No. 4,087,193　　　　　　　　　　Dated May 2, 1978

Inventor(s) William L. Mundy

It is certified that error appears in the above-identified patent and that said Letters Patent are hereby corrected as shown below:

Column 1, line 38, "of" should read -- or --.

Column 3, line 24, "branches" should read -- broaches --.

Signed and Sealed this

Twenty-eighth Day of November 1978

[SEAL]

Attest:

RUTH C. MASON
*Attesting Officer*

DONALD W. BANNER
*Commissioner of Patents and Trademarks*